April 26, 1955 W. C. MULLER ET AL 2,707,164
METHODS OF PRODUCING WHISKY
Filed Dec. 29, 1950 2 Sheets-Sheet 1
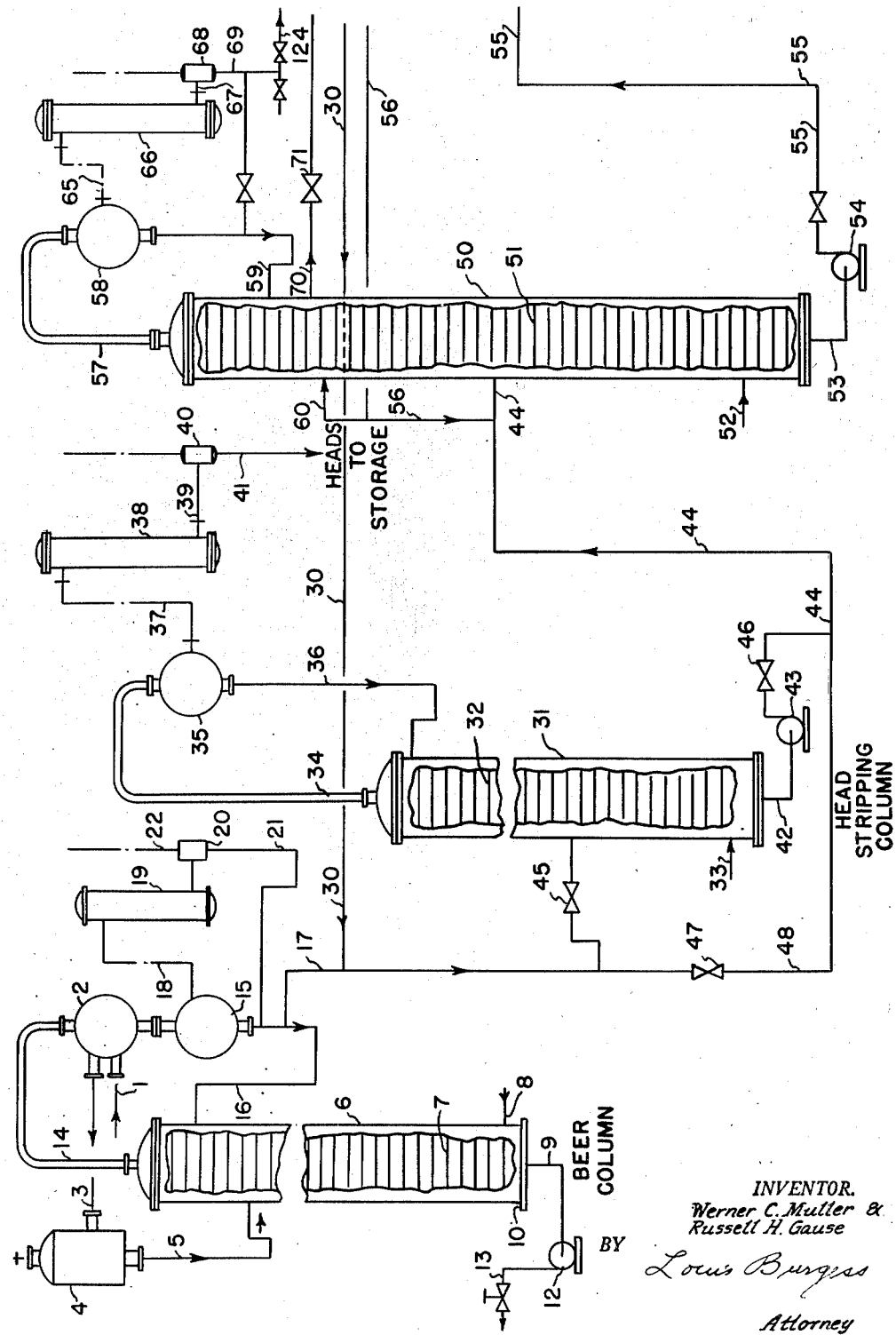
INVENTOR.
Werner C. Muller &
Russell H. Gause
BY
Louis Burgess
Attorney

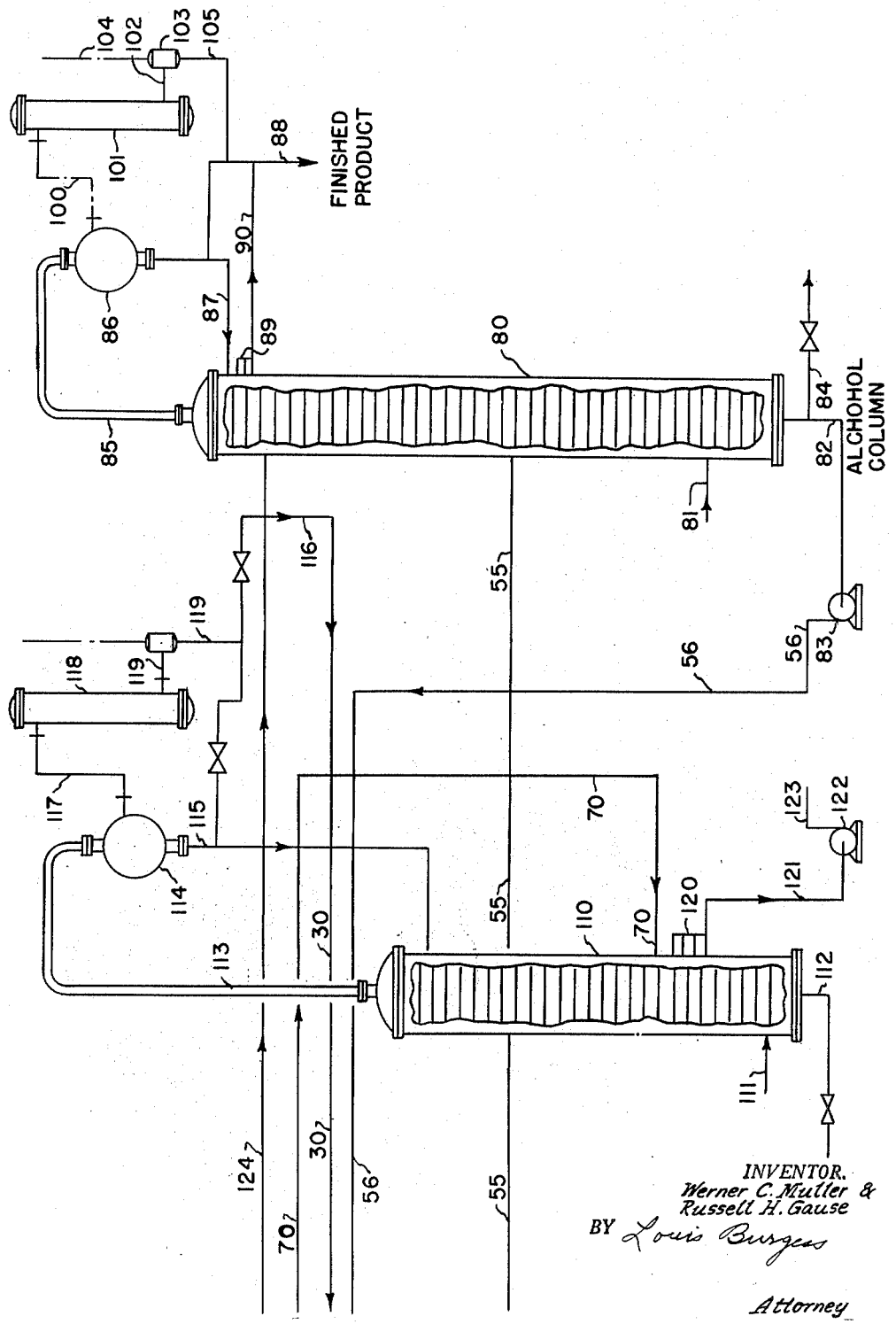

United States Patent Office 2,707,164
Patented Apr. 26, 1955

2,707,164

METHODS OF PRODUCING WHISKY

Werner C. Muller, Reading, and Russell H. Gause, Glendale, Ohio, assignors to National Distillers Products Corp., a corporation of Virginia Application December 29, 1950, Serial No. 203,482

1 Claim. (Cl. 202—39.5)

This invention is a new and useful improvement in methods of producing whisky and will be fully understood from the following description read in conjunction with the drawing, which is a diagrammatic showing of apparatus in which the invention may be carried out.

Referring to the drawing, a dilute aqueous alcohol prepared in the usual way by the mashing and fermentation of cereal or other starch-containing material, is introduced through pipe 1 to heat-exchanger 2, flowing thence through pipe 3, to vapor separator 4, from which it is metered into pipe 5, discharging into the upper end of rectifying column 6. Column 6 is of the type known in the art as a beer column and is equipped in the customary manner with a large number of horizontal trays 7, each provided with a downflow pipe adapted to retain a predetermined depth of liquid on the upper surface of the tray and with the customary sieve plates or similar devices for dispersing up-flowing vapor through the said retained liquid. Steam is introduced to column 6 through pipe 8 to the extent necessary to distill the alcohol and other volatile organic compounds out of the mash.

The residue of water and non-volatile substances (slop) is withdrawn through pipe 9 from base 10 of column 6 and diverted from the system by pump 12 through valved pipe 13.

The vapors withdrawn from the upper end of column 6 through pipe 14 consist of water, ethyl alcohol and other volatile organic substances. These are partly condensed in heat-exchanger 2. The condensation is substantially completed in condenser 15. Part of the condensate is returned to column 6 as reflux through the pipe 16 and the remainder is withdrawn through pipe 17. Any vapor remaining uncondensed in 15 is conducted through pipe 18 to final condenser 19. The condensate from 19 is returned through lookbox 20 and pipe 21 into line 17, any material remaining uncondensed at this point being diverted to the atmosphere through pipe 22.

As an ordinary practice the condensed overhead from beer column 6 withdrawn through pipe 17 is about 120 proof. We are not however limited to this concentration but may maintain at this point any concentration at which the ethyl alcohol and other volatile organic materials will be carried overhead, but not in any event lower than about 30 proof.

This material, preferably combined with a small amount of a subsequently derived cut to be hereinafter referred to, introduced through pipe 30, is discharged into the mid-portion of rectifying column 31. This column is of the type conventionally known in the art as a heads stripping column. It is provided with a large number of horizontal trays 32 equipped with downflow pipes (not shown) adapted to maintain a predetermined depth of liquid on the upper surface of each plate and with liquid-vapor contacting devices (not shown) such as bell caps, adapted to intimately disperse up-flowing vapor into the liquid so maintained. Steam is supplied to the lower portion of column 31 through pipe 33 to the extent necessary to effect some topping in column 31 and a cut in vapor phase is taken overhead through the pipe 34. This cut is the so-called heads or light ends, presumably containing acetaldehyde, very light esters, biacetyl and thioacetaldehyde. It is partly condensed in condenser 35 to the extent necessary to maintain the requisite amount of reflux for column 31 which reflux is returned through pipe 36 into the upper end of column 31. A cut of so-called heads is continuously withdrawn in vapor phase from condenser 35 through pipe 37 into the condenser 38 and the condensate from 38 is diverted from the system through pipe 39, lookbox 40 and pipe 41.

An aqueous alcohol, from which the heads have been removed, is withdrawn from the base of column 31 through pipe 42 and discharged by pump 43 and pipe 44 into an intermediate section of the next succeeding column.

Alternatively we may, if desired, by-pass the heads stripping column 31 by closing valves 45 and 46, and by opening valve 47, conduct the condensate from the beer column through pipe 17 directly through pipes 48 and 44 into the intermediate section of the next succeeding column.

Pipe 44 discharges into the mid-section of column 50. This column is provided with a number of trays 51 with downflow pipes (not shown) to retain a predetermined depth of liquid on the upper surfaces of the trays and with liquid-vapor contacting devices such as bell caps (not shown) to intimately disperse ascending vapor into the liquid so retained. In case the column 50 is equipped with about 50 trays, we find it convenient to introduce the aqueous alcohol from pipe 44 onto the upper surface of approximately the 30th tray. In operation steam is continuously introduced adjacent the base of column 50 through pipe 52. Aqueous alcohol of from 8 to 40 proof is continuously withdrawn from the base of column 50 through pipe 53 and discharged by pump 54 through pipe 55 to the next succeeding unit in the series. The said steam is introduced to the extent of from 4 to 10 pounds per gallon of 100 proof alcohol so withdrawn. We maintain a concentration on the trays immediately below the point at which pipe 44 discharge into column 50, of from 20 to 100 proof and preferably from 30 to 80 proof in the liquid phase.

In ordinary practice where the overhead from the beer column is at about 120 proof this will require the introduction of considerable water supplied through pipe 56 discharging into pipe 44 and thereby commingling with the aqueous alcohol entering column 50. If the overhead from the beer column is at a lower proof, less water will be required. The lowest alcohol concentration at which the overhead from the beer column may be taken off through pipe 17 is that necessary to maintain the desired proof in the liquid phase immediately below the point at which pipe 44 discharges into column 50, assuming that no additional water is introduced through pipe 56.

The vapor passing off through pipe 57 is principally condensed in condenser 58 and returned as reflux through pipe 59 into the upper end of column 50. At a point intermediate between the point at which pipes 44 and 59 discharge into column 50, additional water is introduced through pipe 60. In the case in which, for example, column 50 is equipped with approximately 50 horizontal plates, pipe 60 may discharge into column 50 onto the upper surface of plate 45. Substantially all of the overhead from pipe 57 is condensed and returned to the upper end of column 50 through pipe 59. The amount of water added through pipe 60 is coordinated with the reflux to maintain a concentration of from 70 to 140 proof in the liquid phase on the trays in column 50 between pipes 60 and 44.

Preferably column 50 contains a number of trays (in case the column has 50 trays approximately 5) above the point at which the pipe 60 discharges into column 50. These trays constitute a rectifying section in which the concentration of ethyl alcohol increases progressively from tray to tray in the upwardly direction. Any vapor uncondensed in the condenser 58 is conducted through pipe 65 into final condenser 66. The condensate from 66 is discharged through pipe 67 and lookbox 68 into pipe 69. This condensate is an ethyl alcohol fraction enriched in esters of low boiling point, and based on the ethyl alcohol content may run from 180 to 192 proof.

A small amount of aqueous extract, preferably not exceeding 5% by volume of the ethyl alcohol introduced through pipe 44 to column 50, is continuously withdrawn from column 50 from a point above the point at which the pipe 60 discharges into the column. This may conveniently be done by means of the pipe 70 controlled by valve 71 adapted to withdraw liquid from the tray immediately above the point at which pipe 60 discharges into column 50. The undesirable constituents of the distillate from the standpoint of whisky manufacture will be found highly concentrated in the fraction so withdrawn.

The aqueous alcohol freed of such constituents at a concentration of from 8 to 40 proof flowing from the base of column 50 is discharged through the pipe 55 into the next succeeding unit of the system. This is the rectifying column 80 and is of the type generally referred to in the trade as an "alcohol column." Column 80 contains a large number of horizontal trays (preferably of the order of 65), each of which is provided with downflow pipes (not shown) adapted to retain a predetermined depth of liquid on the upper surfaces of the trays and with liquid-vapor contacting devices, such as bell caps, adapted to intimately disperse ascending vapor into the said retained liquid. Pipe 55 discharges the aqueous alcohol into this column at an intermediate point. Steam is introduced into this column adjacent the base thereof through pipe 81. As is usual practice in the operation of an alcohol column, the amount of steam introduced is sufficient to distill substantially all of the ethyl alcohol out of the liquid reaching the lower end of the column, which is withdrawn through pipe 82. To the extent to which make-up water is required for introduction to column 50 through pipes 44 or 60, this water is diverted by pump 83 discharging into pipe 56. Any excess over this amount is run to waste through valved pipe 84.

Vapors reaching the upper part of the column 80 are withdrawn through pipe 85 to condenser 86 in which they are substantially completely condensed, sufficient of the condensate being returned to the upper end of column 80 through pipe 87 to provide the requisite amount of reflux, the remainder being withdrawn as finished product through pipe 88. The finished product at this point will probably have a proof between 150 and 160. It will be found to contain to a high degree the desirable flavoring constituents and to be relatively free from those constituents which impart sharpness and bite. Although it still requires aging to develop into a finished whisky, it will require relatively less aging than similar products of the prior art and will, on aging, develop into a superior product.

Any vapors uncondensed in condenser 86 are conducted through pipe 100 into final condenser 101, from which the condensate discharges through pipe 102 into lookbox 103. Any material in gas phase at this point is discharged to the atmosphere through pipe 104 and the condensate is returned through pipe 105 into finished product pipe 88.

The cut which was separated in column 50 and withdrawn through side outlet 70, as hereinbefore stated, contains organic constituents which are undesirable in the finished product and which are largely responsible for the sharpness and bite in the final product. These are passed through pipe 70' into the mid-section of rectifying column 110. This column is equipped with a large number of horizontal trays, each of which is provided with the customary downflow pipes to retain a predetermined depth of liquid on the upper surfaces of the trays, and with the customary liquid-vapor contacting devices, such as bell caps, to intimately disperse ascending vapor into the liquid so retained. Steam is introduced into the lower part of this column through pipe 111 to the extent necessary to strip the bottoms which consist essentially of water and are discharged to waste through pipe 112.

The organic constituents reaching the upper part of this column consist predominantly of ethyl alcohol and are withdrawn in vapor phase through outlet pipe 113 to condenser 114. The condensate leaving condenser 114 through pipe 115, to the extent necessary to maintain the requisite amount of reflux, is returned to the upper end of column 110 and the remainder is conducted away through pipe 116, discharging into pipe 30, by which it is returned to feed line 17, to be combined with the overhead from the beer still and reprocessed. Any material uncondensed in condenser 114 is conducted through pipe 117 into final condenser 118 from which the condensate returns through pipe 119 into pipe 116.

A cut in liquid phase is withdrawn from the trays at a point intermediate between pipe 70' and the bottom of the column through the side outlets 120, discharging into the pipe 121. The organic constituents of this cut may be generically classified as fusel oils and are forced by pump 122 discharging through pipe 123 to a suitable container.

The product withdrawn from the upper end of column 50 through pipe 69 has been found to contain light constituents, such as esters desirable for inclusion in the final product. For this reason this material is discharged, at least in part, into pipe 124, by which it is in turn discharged into pipe 88, which carries the finished product to point of storage and utilization.

As a specific example of the application of our process 7840 gallons per hour of so-called beer feed derived from the mashing and fermentation of a cereal containing 1540 proof gallons at a proof of 19.6 was introduced to the column 6 through the pipe 5. Steam to the extent of 11,000 pounds per hour was introduced into the base of column 6 through the pipe 8, the substantially alcohol-free slop residue being withdrawn from the base of the column through pipe 9. The overhead from the beer still withdrawn through pipe 17 consisted of 1280 gallons per hour at 120 proof, containing therefore the equivalent of 1540 proof gallons per hour. After blending with the material returned to pipe 17 through the pipe 30, this material consisted of 1301 gallons per hour at 122 proof and was therefore equivalent to 1580 proof gallons per hour. Steam to the extent of 1577 pounds per hour was introduced into the bottom of column 31 through the pipe 33. The heads from column 31 withdrawn through pipe 41 was equivalent to 1.5 gallons per hour containing, as explained, extremely light organic constituents. The stripped material from the base of column 31 discharged through pipe 44 consisted of 1490 gallons per hour at 105 proof and was therefore equivalent to 1577 proof gallons per hour. Steam to the extent of 10,500 pounds per hour was introduced into the base of column 50 through pipe 52. The proof on the trays in column 50 immediately below the point at which pipe 44 discharges was approximately 50, additional water to the extent of 3160 gallons per hour being introduced through the pipe 56 to maintain this proof. Additional water to the extent of 2575 gallons per hour was introduced through the pipe 60, and the proof maintained on the trays immediately below the point at which pipe 60 discharges into the column was approximately 80. The material withdrawn through the side outlet 70 from the upper surface of the tray immediately above the point at which pipe 60 discharges, was 25 gallons per hour containing organic constituents generally classifiable as fusel oil together with ethyl alcohol. The material finally withdrawn from the upper end of the column 50 through the pipe 69 was equal to 15 gallons per hour, consisting predominantly of ethyl alcohol containing a minor percentage of light esters.

The material withdrawn from the base of column 50 through pipe 55 was equal in volume to 8505 gallons per hour at 17.8 proof, corresponding therefore to 1509 proof gallons per hour, which material was discharged to the mid-section of column 80 through pipe 55. Steam to the extent of 12,500 pounds per hour was introduced through pipe 81 into the base of column 80. The material withdrawn from pipe 69 was introduced into the upper part of column 80 through pipe 124. The amount of overhead from column 110 returned through pipe 116 and pipe 30 into pipe 17, was equal to 21 gallons per hour, consisting predominantly of ethyl alcohol at approximately 192 proof, corresponding therefore to 40 proof gallons per hour. The finished product conducted away through pipe 88 was equal in volume to 980 gallons per hour at 156 proof, corresponding therefore to 1537 proof gallons per hour. Compared with similar products of the prior art, it was remarkably free from sharpness and bite, while retaining the fruity and other characteristics which are desirable in a finished whisky.

The foregoing description is furnished by way of illustration and not of limitation and it is therefore our intention that the invention be limited only by the appended claim or its equivalents wherein we have endeavored to claim broadly all inherent novelty.

We claim:

Process for treating aqueous alcohol derived from the fermentation and distillation of cereal mashes for the production of whiskey, which comprises continuously introducing such an aqueous alcohol into a vertically disposed elongated liquid-vapor countercurrent contacting device arranged for vertical downward migration of liquid and vertical upward migration of vapor, continuously introducing steam adjacent the base of said device and continuously withdrawing from the base the major part of the aqueous alcohol so introduced as aqueous alcohol solution of from 8–40 proof containing organic impurities which are desirable flavoring constituents in whiskey production, the amount of steam so introduced being to the extent of from 4–10 pounds per gallon of 100 proof alcohol so withdrawn, the water introduced with said aqueous alcohol being in amount sufficient to maintain a concentration of from 20–100 proof in the liquid phase immediately below the point of introduction of said aqueous alcohol, continuously condensing and refluxing vapor adjacent the upper end of said device, introducing water above the point of introduction of said aqueous alcohol, and below the point of introduction of said reflux, the concentration of ethanol increasing in an upwardly direction between the two last mentioned points, the amount of introduced water and reflux and concentration of the introduced aqueous alcohol being coordinated to maintain a concentration of ethanol of from 70–140 proof between the two above mentioned points of introduction of said water and of said aqueous alcohol and substantially higher than the proof maintained in the liquid phase below the point of introduction of said aqueous alcohol, continuously abstracting organic components containing constituents of said aqueous alcohol undesirable for whiskey production in liquid phase above the point of introduction of said water and continuously abstracting from the upper end of said device an ethyl alcohol fraction enriched in volatile esters, the ethyl alcohol content of said fraction ranging from 180–192 proof.

References Cited in the file of this patent

UNITED STATES PATENTS

| | | |
|---|---|---|
| 887,793 | Guillaume | May 19, 1908 |
| 996,328 | Guillaume | June 27, 1911 |
| 2,290,442 | Metz | July 21, 1942 |
| 2,551,584 | Carlson et al. | May 8, 1951 |
| 2,551,593 | Guilliland et al. | May 8, 1951 |
| 2,551,625 | Morrell et al. | May 8, 1951 |
| 2,551,626 | Morrell et al. | May 8, 1951 |

OTHER REFERENCES

Robinson and Guilliland, Elements of Fractional Distallation, Third Edition, published 1939 by McGraw-Hill Book Company, New York, New York.